UNITED STATES PATENT OFFICE.

HERMAN G. C. PAULSEN, OF NEW YORK, N. Y.

IMPROVEMENT IN CLARIFYING SUGAR.

Specification forming part of Letters Patent No. 28,769, dated June 19, 1860.

*To all whom it may concern:*

Be it known that I, HERMAN G. C. PAULSEN, of the city and county of New York, and State of New York, have invented a new and improved mode of clarifying and defecating solutions of crude sugars and the concentrated juices of sugar-bearing plants; and I do hereby declare that the following is a full and exact description thereof.

The nature of my invention consists in effecting a separation of the nitrogenous substances and the earthy salts from the crude sugar by the application of dilute alcohol. For this purpose I combine alcohol with water in certain proportions, which, applied to the sugar, is heated up to a certain temperature, effecting thereby the clarification and defecation of said sugar.

To enable others skilled in the art of clarifying and defecating solutions of sugar to use my invention, I will proceed to describe its application and operation.

Under the term "alcohol" I understand and mean the anhydrous alcohol or alcohol of one hundred per cent. The combination of alcohol and water in all proportions will effect the desired result; but the combinations above eighty-five (85) per cent. of alcohol are difficult to operate with, and all the combinations below fifteen (15) per cent. of alcohol require too long a time for practical purposes. The combination of alcohol and water which I find to work satisfactorily consists of or very near sixty (60) per cent. alcohol and forty (40) per cent. of water, the percentage by volume according to alcoholometry. The quantity of said combined liquors to be used is about fifty to sixty per cent. of the weight of sugar to be operated upon. The combination of alcohol and water will effect the desired result at all temperatures, provided that at a low temperature the quantity of the liquor used is sufficient to dissolve and keep dissolved the sugar, and sufficient time is given for action; but this is inapplicable for practical purpose. At the temperature of the boiling-point under atmospheric pressure of said combined liquors at about 176° of Fahrenheit the action is not satisfactory and certain on all sugars and concentrated juices of sugar-bearing plants. The temperature at which I find the action of said combined liquors to be most satisfactory and rapid in all cases is a temperature above the boiling-point (176° Fahrenheit) of said combined liquors, and more particularly at about 200° to 210° Fahrenheit.

Having mixed the sugar or the juices of sugar-bearing plants, previously concentrated to the crystallization-point, with a combination of alcohol and water at the required proportions in any suitable vessel, which vessel must be an air-tight-closed vessel strong enough to bear a pressure of fifteen pounds of pressure to the square inch, and it must be supplied with all requisite fixtures to heat the same up by steam and to stir the contents, the stirrer to enter said vessel by a stuffing-box, I commence to apply heat. I continue to heat up till the temperature reaches to 160° to 170° of Fahrenheit. At this temperature I keep it long enough to dissolve all the sugar, stirring all the time, adding at this stage of the operation, little by little, sufficient caustic or milk of lime to neutralize any existing acidity of the solution, which must be determined by tests with litmus-paper. This having been effected, I close up the vessel securely and continue to heat up, constantly stirring till the temperature reaches up to 200° to 210° of Fahrenheit, and at this temperature I keep it for about ten minutes. At the expiration of this time I draw off the solution into another suitable vessel for the purpose of gradually and slowly cooling and settling. By the action of the combined liquor of alcohol and water, and at the above temperature, the nitrogenous substances and the earthy salts separate from the sugar and settle down to the bottom of the vessel. The solution having settled off, which is effected in eight or ten hours, is then drawn from the sediments and boiled down to the crystallization-point in any vessel or apparatus, or in any manner the operator may choose, taking care of course to recover the combined liquor to be used in further and other operations.

I do not claim the application of alcohol by itself to any treatment of sugar without reference to the water present and without the addition of heat.

This improvement being coincident with the improvement for which Letters Patent of the United States were granted to me, dated November 8, 1859, and numbered 26,050, I hereby disclaim the claim of said patent. I do not claim the application of alcohol in combination with water, and all the proportions, as stated, and at the temperature of boiling of said combined liquids.

What I claim as my invention, and desire to secure by Letters Patent, is—

The application of a temperature above the boiling-point under atmospheric pressure of said combined liquors, as herein stated, to raw sugars or the concentrated juices of sugar-bearing plants for the purpose of clarifying and defecating said raw sugars.

New York, May 15, 1860.

HERMAN G. C. PAULSEN.

Witnesses:
BENJAMIN MYERS,
FREDRICK LANGMAN.